US008437125B2

(12) United States Patent  
Jørgensen et al.

(10) Patent No.: US 8,437,125 B2
(45) Date of Patent: May 7, 2013

(54) HOUSING FOR AN ELECTRONIC APPARATUS

(75) Inventors: Claus Jørgensen, Frederiksberg (DK); Herman Scherling, Kokkedal (DK); Duncan Burns, Tarzana, CA (US)

(73) Assignee: Nokia Corporation, Espoo (FI)

( * ) Notice: Subject to any disclaimer, the term of this patent is extended or adjusted under 35 U.S.C. 154(b) by 465 days.

(21) Appl. No.: 12/583,606

(22) Filed: Aug. 24, 2009

(65) Prior Publication Data

US 2011/0043971 A1    Feb. 24, 2011

(51) Int. Cl.
*G06F 1/16* (2006.01)

(52) U.S. Cl.
USPC ............ 361/679.27; 361/379.01; 361/679.02; 361/679.09; 29/592.1; 429/96; 429/100; 312/223.1; 312/223.2

(58) Field of Classification Search ............. 361/679.26, 361/679.27
See application file for complete search history.

(56) References Cited

U.S. PATENT DOCUMENTS

| | | | | |
|---|---|---|---|---|
| 6,004,690 A * | 12/1999 | Van Lerberghe | ............. | 429/100 |
| 6,178,084 B1 * | 1/2001 | Shibasaki | ................. | 361/679.33 |
| 6,191,942 B1 * | 2/2001 | Lee et al. | ................. | 361/679.23 |
| 6,262,886 B1 * | 7/2001 | DiFonzo et al. | ......... | 361/679.34 |
| 6,274,266 B1 * | 8/2001 | Wang | ............................ | 429/163 |
| 6,459,591 B2 * | 10/2002 | Liu | ................................ | 361/756 |
| 6,842,336 B2 * | 1/2005 | Schremmer et al. | ..... | 361/679.56 |
| 7,353,003 B2 * | 4/2008 | Boman et al. | ................. | 455/90.3 |
| 7,515,431 B1 * | 4/2009 | Zadesky et al. | ............... | 361/752 |
| 7,660,127 B2 * | 2/2010 | Weber et al. | .................. | 361/752 |
| 7,817,407 B2 * | 10/2010 | Tanaka | ..................... | 361/679.02 |
| 7,839,646 B2 * | 11/2010 | Zadesky et al. | ............... | 361/728 |
| 7,843,686 B2 * | 11/2010 | McEwan et al. | ......... | 361/679.55 |
| 7,855,874 B2 * | 12/2010 | Nakajima et al. | ........ | 361/679.02 |
| 7,869,205 B2 * | 1/2011 | Chin | ........................ | 361/679.34 |
| 2003/0100275 A1 | 5/2003 | Hsu et al. | .......................... | 455/90 |
| 2004/0016628 A1 * | 1/2004 | Hochgesang et al. | ........ | 200/5 A |
| 2006/0268528 A1 | 11/2006 | Zadesky et al. | ................ | 361/728 |
| 2007/0184727 A1 * | 8/2007 | Kanayama et al. | ........... | 439/736 |
| 2008/0019093 A1 * | 1/2008 | Hongo | ............................ | 361/693 |
| 2008/0165485 A1 * | 7/2008 | Zadesky et al. | ................ | 361/683 |
| 2008/0304214 A1 * | 12/2008 | Nakajima | ...................... | 361/680 |
| 2009/0047572 A1 * | 2/2009 | Pynenburg et al. | ........... | 429/100 |
| 2009/0201636 A1 * | 8/2009 | Doherty et al. | ........... | 361/679.26 |
| 2009/0247242 A1 * | 10/2009 | Wojack et al. | .............. | 455/575.1 |
| 2010/0055389 A1 * | 3/2010 | Allore et al. | ................... | 428/119 |
| 2010/0056231 A1 * | 3/2010 | Weiss et al. | ................ | 455/575.1 |
| 2010/0061039 A1 * | 3/2010 | Sanford et al. | ........... | 361/679.01 |
| 2011/0038116 A1 * | 2/2011 | Tseng | ....................... | 361/679.09 |

FOREIGN PATENT DOCUMENTS

| WO | WO 2010/025029 A1 | 3/2010 |
|---|---|---|
| WO | WO 2010/045161 A1 | 4/2010 |
| WO | WO 2010/050971 A1 | 5/2010 |

* cited by examiner

*Primary Examiner* — Anthony Q Edwards

(74) *Attorney, Agent, or Firm* — Harrington & Smith

(57) ABSTRACT

A portable electronic apparatus including: a plurality of electronic components; a unitary body having an exterior continuous surface, a first aperture in the exterior continuous surface and a second aperture in the exterior continuous surface, wherein a first portion of the exterior continuous surface and the first aperture define a first major face of the apparatus and a second portion of the exterior continuous surface and the second aperture define a second major face of the apparatus, and wherein the first aperture is sized and positioned for the insertion of at least some of the electronic components into an interior housing volume of the unitary body and is closed by an electronic component providing at least part of a user interface and wherein the second aperture is sized and positioned for closure by the insertion of an energy storage electronic component.

19 Claims, 4 Drawing Sheets

HOUSING FOR AN ELECTRONIC APPARATUS

FIELD OF THE INVENTION

Embodiments of the present invention relate to a housing for an electronic apparatus and/or a method of manufacturing a housing for an electronic apparatus.

BACKGROUND TO THE INVENTION

Traditional housing design for portable electronic apparatus typically consists of two semi shells clamped together and thus encapsulating and protecting the internal electronics. Very often this "sandwich approach" implies exterior screw interfaces and inter-part splitlines that remain visible to the end user, most often causing great conflict with the Industrial design intent for the apparatus. Furthermore a chassis designed using the "sandwich approach" is difficult to make rigid without using a high number of screws or other kinds of means of fixation.

BRIEF DESCRIPTION OF VARIOUS EMBODIMENTS OF THE INVENTION

According to various, but not necessarily all, embodiments of the invention there is provided a portable electronic apparatus comprising:

a plurality of electronic components;

a unitary body having an exterior continuous surface, a first aperture in the exterior continuous surface and a second aperture in the exterior continuous surface, wherein a first portion of the exterior continuous surface and the first aperture define a first major face of the apparatus and a second portion of the exterior continuous surface and the second aperture define a second major face of the apparatus, and wherein the first aperture is sized and positioned for the insertion of at least some of the electronic components into an interior housing volume of the unitary body and is closed by an electronic component providing at least part of a user interface and wherein the second aperture is sized and positioned for closure by the insertion of an energy storage electronic component.

According to various, but not necessarily all, embodiments of the invention there is provided a method of manufacturing a portable electronic apparatus comprising:

a unitary body having an exterior continuous surface, a first aperture in the exterior continuous surface and a second aperture in the exterior continuous surface, wherein a first portion of the exterior continuous surface and the first aperture define a first major face of the apparatus and a second portion of the exterior continuous surface and the second aperture define a second major face of the apparatus, insertion of at least some of the electronic components into an interior housing volume of the unitary body via the first aperture closing the first aperture by inserting an electronic component that provides at least part of a user interface and closing the second aperture by inserting an energy storage electronic component.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

The FIGS. 1 to 7 schematically illustrate one example of a manufacturing process that is suitable for manufacturing a portable electronic apparatus 20.

Figure 1:
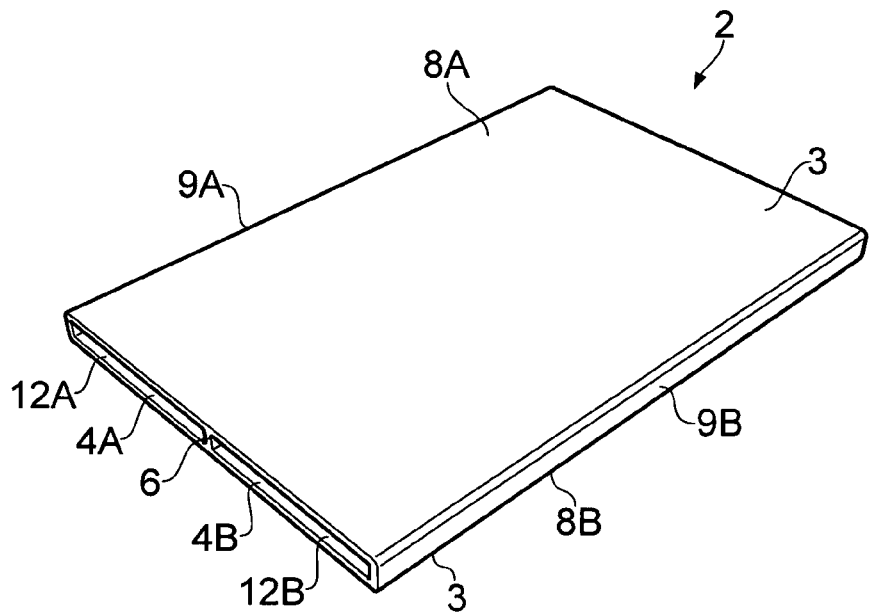
FIG. 1 is a schematic illustration of a one-piece extrusion that forms a unitary body of a portable electronic apparatus.
Figure 2:
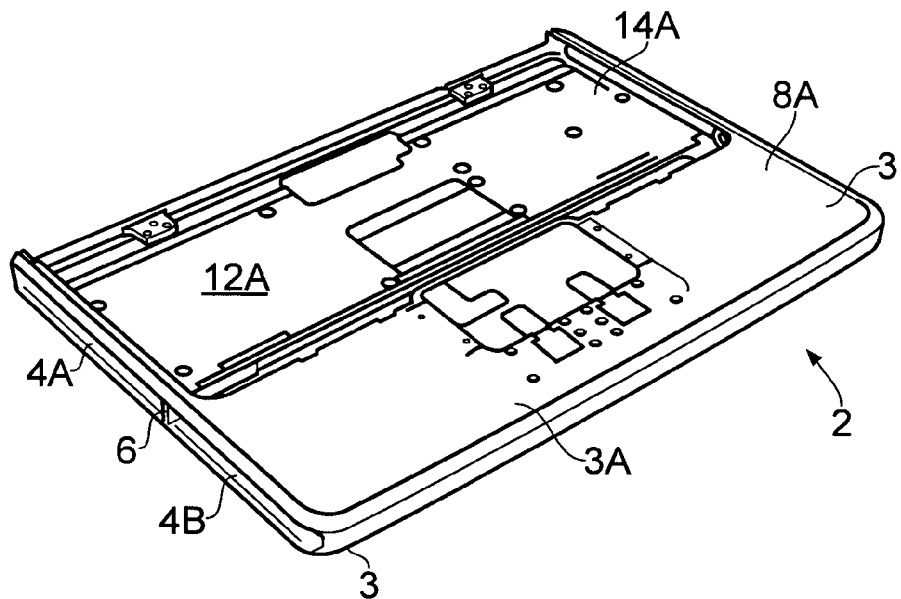
FIG. 2 schematically illustrates, from a top perspective view, the unitary body with first and second apertures.
Figure 3:
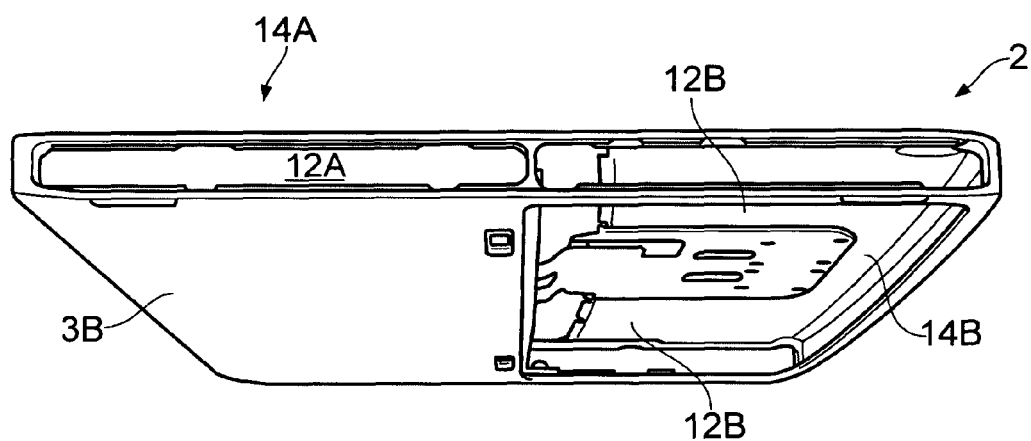
FIG. 3 schematically illustrates, from a bottom perspective view, the unitary body with first and second apertures.
Figure 4:
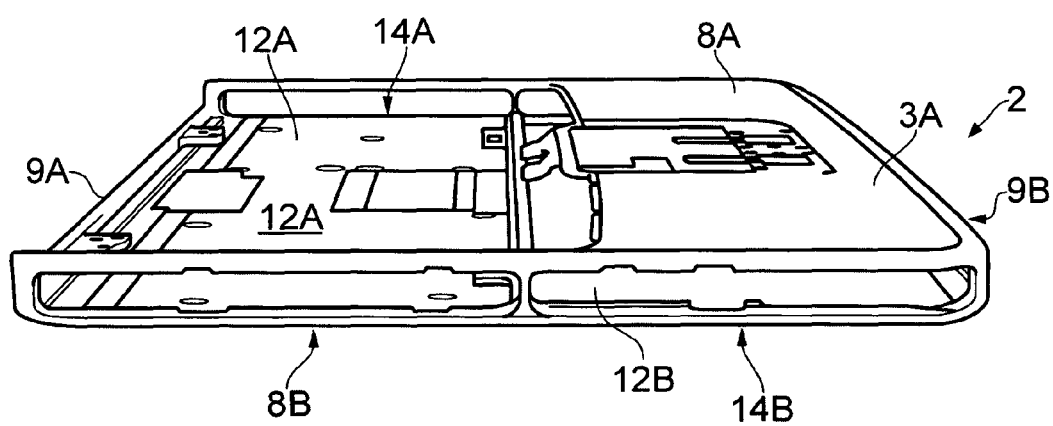
FIG. 4 schematically illustrates, from a side perspective view, the unitary body with first and second apertures.
Figure 5:
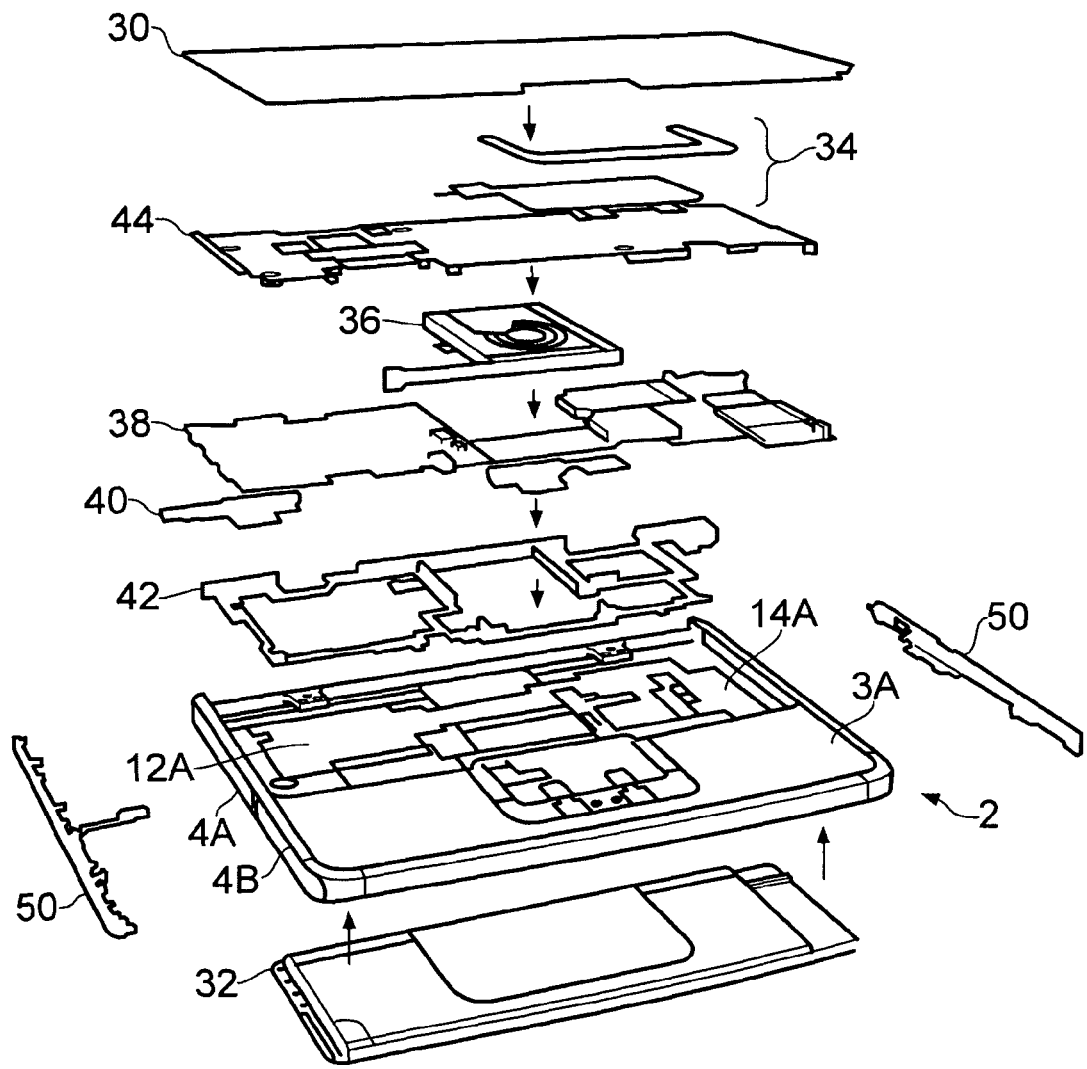
FIG. 5 is a schematic illustration of the insertion of components into the unitary body via the apertures.
Figure 6:
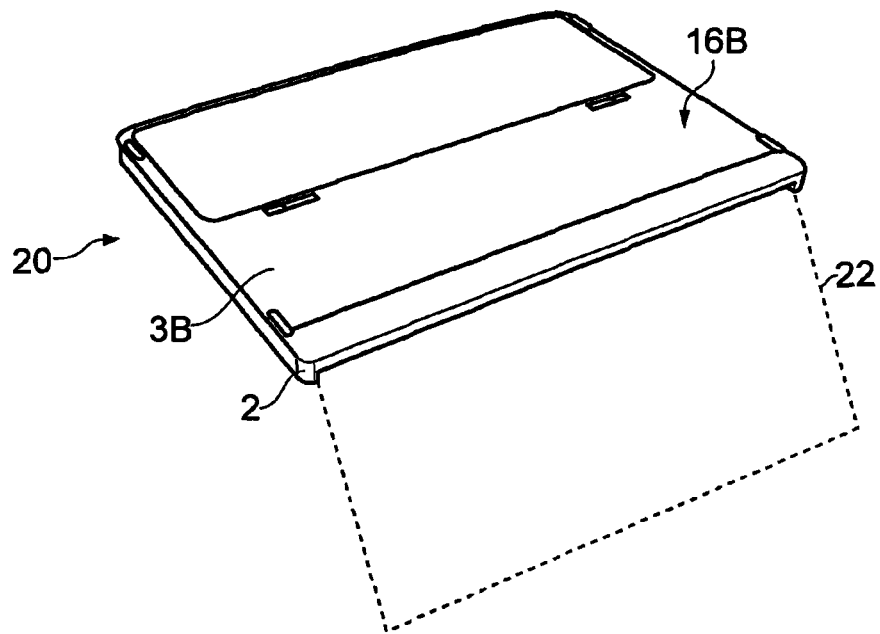
FIGS. 6 and 7 are schematic illustrations of the manufactured portable electronic apparatus from bottom perspective and a top perspective.
Figure 7:
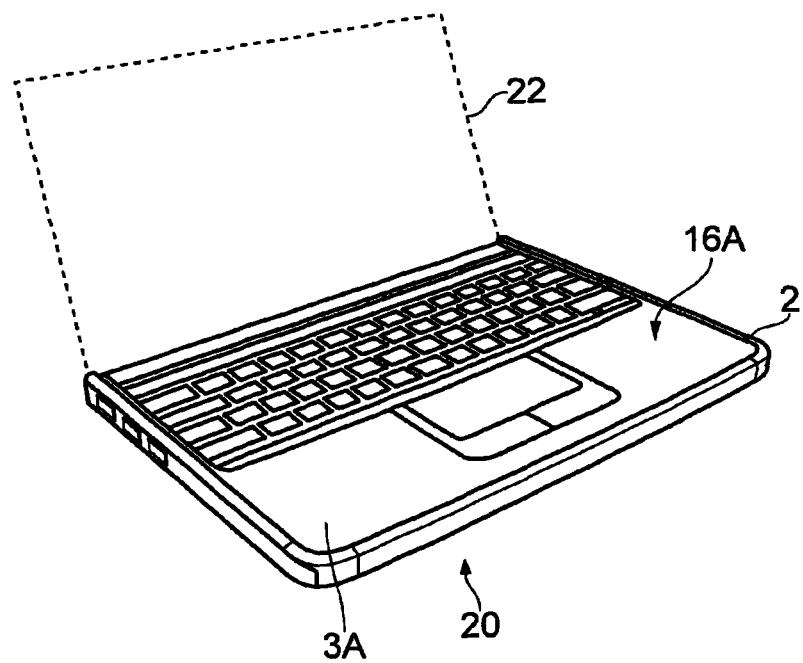

FIG. 1, which is a schematic illustration of a one-piece extrusion that forms a unitary body 2 of a portable electronic apparatus, introduces the following features:

2 a unitary body/one-piece extrusion
3 exterior continuous surface
8A top face/first major face
8B bottom face/second major face
9A back face
9B front face
4A a first hollow elongate extruded body portion
4B a second hollow elongate extruded body portion
6 an internal portion of the extruded unitary body
12A a first housing volume
12B a second housing volume FIGS. 2 to 4 schematically illustrate the unitary body 2 after the one-piece extrusion has been machined to form first and second apertures. FIG. 2 is a top perspective view. FIG. 3 is a bottom perspective view. FIG. 4 is a side perspective view. These Figures additionally introduce the following features:

14A a first aperture
14B a second aperture
3A a first portion of the exterior continuous surface
3B a second portion of the exterior continuous surface FIG. 5, which is a schematic illustration of the insertion of components into the unitary body 2 via the apertures, introduces the following features:

30-38 electronic components
   30 an electronic component providing at least part of a user interface (e.g. keyboard module)
   32 an energy storage electronic component (e.g. battery module)
   34 touch pad components,
   36 hard disk drive,
   38 motherboard including a central processing unit, bus and main memory
40-46 mechanical components—
   40 hinge brackets,
   42 internal support frame,
   44 thermal plate
50 side panels FIGS. 6 and 7, which are schematic illustrations of the manufactured portable electronic apparatus 20 from bottom perspective and a top perspective, introduce the following features:

20 A portable electronic apparatus
16A a first major face of the apparatus 16B a second major face of the apparatus
22 a hinged display portion.

FIG. 1 is a schematic illustration of a one-piece extrusion that forms a unitary body 2 of a portable electronic apparatus 20.

The unitary body 2 is one-piece. The unitary body 2 comprises a first hollow elongate body portion 4A and a second hollow elongate extruded body portion 4B. The first hollow elongate body portion 4A and the second hollow elongate extruded body portion 4B are interconnected via a common elongate internal wall portion 6 of the unitary body 2. The unitary body 2 forms a 'tube' with two parallel channels (pockets).

The unitary body 2 is internally divided, by the internal portion 6, into a first housing volume 12A defined by the interior of the first hollow elongate body portion 4A and a second housing volume 12B defined the interior of the second hollow elongate body portion 4B.

The unitary body 2 has a continuous exterior surface 3. The surface comprises a top face 8A, a bottom face 8B that opposes the top face 8A and also a back face 9A and a front face 9B that opposes the front face 9B. The top face and the bottom face are the major faces having a greater area.

The unitary body 2 may be formed by extrusion. The extrusion direction is along the length of the hollow elongate body portions 4A, 4B. The unitary body 2 may be a one-piece aluminum extrusion.

FIGS. 2 to 4 schematically illustrate the unitary body 2 after the one-piece extrusion has been machined to form first and second apertures. FIG. 2 is a top perspective view. FIG. 3 is a bottom perspective view. FIG. 4 is a side perspective view.

First and second apertures 14A, 14B are formed in the unitary body 2 by selective removal of portions of the body. This may be achieved by machining, for example using precision high speed CNC milling.

A first aperture 14A is formed in the top face 8A through to the first hollow elongate body portion 4A. The first aperture 14A is formed in this example at the back of the unitary body 2 and across its length. A first portion 3A of the top face 8A is retained.

A second aperture 14B is formed in the bottom face 8B through to the second hollow elongate body portion 4B. The second aperture 14B is formed in this example at the front of the unitary body 2 and across its length. A second portion 3B of the bottom face 8B is retained.

The first aperture 14A is formed opposite the second portion 3B of the exterior continuous surface. The second aperture 14B is formed opposite the first portion 3A of the exterior continuous surface.

FIG. 5 is a schematic illustration of the insertion of components into the unitary body 2 via the apertures.

The first aperture 14A is sized and positioned for the insertion of components into an interior housing volume 12A of the unitary body 2. The components in this example include both electronic components 30-38 and mechanical components 40-46.

The inserted components are, in order: an internal support frame 42 for supporting subsequently inserted components; hinge brackets 40 for mounting a hinged display 22; motherboard 38 including a central processing unit, bus and main memory;
a hard disk drive 36; a thermal plate 44 for thermally isolating components on the motherboard from overlying components;
touch pad components 34; and a keyboard module 30.

It should be realized that these components are examples of suitable components. The same or different components may be inserted in different orders.

The first aperture 14A is sized and positioned such that it is closed by an electronic component 30 providing at least part of a user interface. The electronic component 30 forms a closure or seal to the first aperture 14A. This defines an enclosure that houses other components.

It should be realized that a keyboard module 30 is one example of many different electronic components that could provide at least part of a user interface. For example, a display is an electronic component that provides at least part of a user interface.

The second aperture 14B is sized and positioned for the insertion of an energy storage electronic component 32. In the illustrated example, the energy storage electronic component 32 is a battery module.

The second aperture 14B is sized such that it is substantially filled by the energy storage electronic component 32 which forms a closure or seal to the second aperture 14B.

The first aperture 14A provides for component insertion into the first housing volume 12A but not the second housing volume 12B.

The second aperture 12B provides for insertion of the electronic storage component into the second volume 12B but not for electronic component insertion into the first housing volume 12A.

The openings to the first hollow elongate body portion 4A and the second hollow elongate extruded body portion 4B are sealed at both ends. A first side panel 50 covers the openings to both the first hollow elongate body portion 4A and the second hollow elongate body portion 4B at one side. A second side panel 50 covers the openings to both the first hollow elongate body portion 4A and the second hollow elongate body portion 4B at the other side.

The first and or second side panel may comprise connector interfaces.

The unitary body 2 allows the majority of the housed components of the portable electronic apparatus 20 to be inserted via the first aperture 14A. It may, in some implementations, be possible to additionally insert some components via the openings to the first hollow elongate body portion 4A before their closure.

FIGS. 6 and 7 are schematic illustrations of the manufactured portable electronic apparatus 20 from bottom perspective and a top perspective.

The Figures illustrate a portable electronic apparatus 20 comprising: a plurality of electronic components; a unitary body 2 having an exterior continuous surface, a first aperture 14A in the exterior continuous surface and a second aperture 14B in the exterior continuous surface, wherein a first portion 3A of the exterior continuous surface and the first aperture 14A define a first major face 16A of the apparatus 20 and a second portion 3B of the exterior continuous surface and the second aperture 14B define a second major face 16B of the apparatus 20, and wherein the first aperture 14A is sized and positioned for the insertion of at least some of the electronic components into an interior housing volume 12A of the unitary body 2 and is closed by an electronic component 20 providing at least part of a user interface and wherein the second aperture 14B is sized and positioned for closure by the insertion of an energy storage electronic component 32.

The apparatus 20 may operate as any suitable electronic apparatus. It is sized to be portable by a human. It may be a personal computer. It may have a clamshell design or a tablet design.

The exterior surface of the apparatus 20 is formed by the exterior surface of the unitary body and by the exterior surface of the keyboard 30 and battery 32. The exterior surface of the apparatus is uninterrupted or unbroken (continuous) except whether a component is attached or is to be attached. There are no other physical discontinuities in the exterior surface. Having a minimum of physical breaks, creates a structure that is extremely integrated and robust, allowing the slimmest possible design that has mechanical strength and rigidity.

The use of external screws or fasteners can be completely avoided and visible splitlines can be reduced. this provides a very clean and consistent industrial design, while obtaining a superior rigidity and strength.

Although embodiments of the present invention have been described in the preceding paragraphs with reference to various examples, it should be appreciated that modifications to the examples given can be made without departing from the scope of the invention as claimed. For example, alternative processes to produce the single-piece design could also include molding of the aluminum or alternatively magnesium with subsequent machining, or even a plastic part by injection molding only.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A portable electronic apparatus comprising:
   a plurality of electronic components;
   a unitary body having an exterior continuous surface, a first aperture in the exterior continuous surface and a second aperture in the exterior continuous surface, wherein a first portion of the exterior continuous surface and the first aperture define a first major face of the apparatus and a second portion of the exterior continuous surface and the second aperture define a second major face of the apparatus, wherein the first and second major faces are opposing faces and the first aperture opposes the second portion and the second aperture opposes the first portion, and wherein the first aperture is sized and positioned for the insertion of at least some of the electronic components into an interior housing volume of the unitary body via the first aperture and is configured to be closed by an electronic component providing at least part of a user interface and wherein the second aperture is sized and positioned for closure by the insertion of an energy storage electronic component.

2. A portable electronic apparatus as claimed in claim 1, wherein the unitary body is a one-piece extrusion and the first and second apertures formed by selective removal of portions of the one-piece extrusion.

3. A portable electronic apparatus as claimed in claim 1, wherein the exterior continuous surface is a continuous one-piece metallic surface without abutments or fasteners.

4. A portable electronic apparatus as claimed in claim 1, wherein the unitary body is a one-piece aluminum extrusion.

5. A portable electronic apparatus as claimed in claim 1, wherein the unitary body is internally divided, by an internal portion of the unitary body, into a first housing volume and a second housing volume, and wherein the first aperture provides for electronic component insertion into the first housing volume but not the second housing volume.

6. A portable electronic apparatus as claimed in claim 1, wherein the unitary body is an extrusion of connected parallel first and second hollow elongate body portions wherein the first aperture is formed in first hollow elongate body portion and the second aperture is formed in the second hollow elongate body portion.

7. A portable electronic apparatus as claimed in claim 1, wherein the second aperture provides for insertion of the electronic storage component into the second volume but not for electronic component insertion into the first housing volume.

8. A portable electronic apparatus as claimed in claim 1, wherein the electronic component providing at least part of a user interface and closing the first aperture is a keyboard module.

9. A portable electronic apparatus as claimed in claim 1, wherein the apparatus is bounded by a cuboid that defines opposing top and bottom faces, opposing back and front faces and opposing side faces, wherein the top and bottom faces have the largest areas and correspond to respectively the first major face and the second major face of the unitary body.

10. A method of manufacturing a portable electronic apparatus comprising:
    providing a unitary body having an exterior continuous surface, a first aperture in the exterior continuous surface and a second aperture in the exterior continuous surface, wherein a first portion of the exterior continuous surface and the first aperture define a first major face of the apparatus and a second portion of the exterior continuous surface and the second aperture define a second major face of the apparatus, and wherein the first and second major faces are opposing faces and the first aperture opposes the second portion and the second aperture opposes the first portion,
    insertion of electronic components into an interior housing volume of the unitary body via the first aperture,
    closing the first aperture by inserting an electronic component that provides at least part of a user interface, and
    closing the second aperture by inserting an energy storage electronic component.

11. A method as claimed in claim 10, further comprising forming the unitary body by extrusion of a hollow elongate body followed by machining the first and second apertures.

12. A method as claimed in claim 10, further comprising forming the unitary body by extrusion of connected parallel first and second hollow elongate body portions followed by machining the first hollow elongate body portion to form the first aperture and by machining the second hollow elongate body portion to form the second aperture.

13. A method as claimed in claim 10, further comprising sealing the extrusion using side panels.

14. A method as claimed in claim 10, wherein the unitary body is formed from aluminum.

15. A method as claimed in claim 10, further comprising insertion of at least some of the electronic components into an interior housing volume of the unitary body via the first aperture comprises inserting at least a motherboard, then a hard disk drive, then touch pad components.

16. A method as claimed in claim 10, further comprising insertion of at least some mechanical components via the first aperture.

17. A method as claimed in claim 16, wherein the mechanical components include hinge brackets of a display.

18. A portable electronic apparatus manufactured according to the method of claim 10.

19. A housing for an electronic device comprising a unitary body having a first and second major face, said first and second faces being opposite to one another, said second face having an aperture for the insertion of an energy storage component said first face having an aperture sized and positioned for the insertion of electronic components into an interior housing volume of the unitary body via the aperture of the first face, the electronic components comprising a substantial portion of the electronics housed in the electronic device, wherein the aperture of the first face and the aperture of the second face do not substantially overlap.

* * * * *